(12) United States Patent
Vishwanathan et al.

(10) Patent No.: US 10,925,010 B2
(45) Date of Patent: Feb. 16, 2021

(54) POWER HEADROOM REPORTING WITH CHANNEL SELECTION

(71) Applicant: Apple Inc., Cupertino, CA (US)

(72) Inventors: Narayan Vishwanathan, San Diego, CA (US); Yujian Zhang, Beijing (CN); Hong He, Beijing (CN); Seunghee Han, San Jose, CA (US); Youn Hyoung Heo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/243,856

(22) Filed: Jan. 9, 2019

(65) Prior Publication Data

US 2019/0349869 A1 Nov. 14, 2019

Related U.S. Application Data

(63) Continuation of application No. 15/540,923, filed as application No. PCT/US2015/066772 on Dec. 18, 2015, now Pat. No. 10,219,228.
(Continued)

(51) Int. Cl.
*H04W 52/36* (2009.01)
*H04W 72/04* (2009.01)

(52) U.S. Cl.
CPC ....... *H04W 52/365* (2013.01); *H04W 72/042* (2013.01)

(58) Field of Classification Search
CPC . H04W 72/042; H04W 52/365; H04W 72/04; H04W 52/36; H04W 52/146; H04W 52/288
See application file for complete search history.

(56) References Cited

U.S. PATENT DOCUMENTS

| 10,219,228 B2 | 2/2019 | Vishwanathan et al. |
| 2009/0180435 A1 | 7/2009 | Sarkar |

(Continued)

FOREIGN PATENT DOCUMENTS

| CN | 107113748 A | 8/2017 |
| EP | 2509373 A1 | 10/2012 |

(Continued)

OTHER PUBLICATIONS

"U.S. Appl. No. 15/540,923, Corrected Notice of Allowability dated Dec. 11, 2018", 2 pgs.
(Continued)

*Primary Examiner* — Anez C Ebrahim
(74) *Attorney, Agent, or Firm* — Kowert, Hood, Munyon, Rankin & Goetzel, P.C.

(57) ABSTRACT

Systems, apparatus, user equipment (UE), evolved node B (eNB), and methods are described for generating an extended power headroom report (ePHR) based on an uncertainty associated with a physical downlink control channel communication granting an uplink grant for a physical uplink shared channel communication when the system is configured for simultaneous physical uplink shared channel and physical uplink control channel communications. Some embodiments are structured to generate the ePHR using a type 2 report regardless of the uncertainty associated with the ePHR, while other embodiments generate the ePHR using a reference format. In some embodiments, a UE communicates a timing field with a UE capability communication indicating whether the UE meets timing requirements to avoid uncertainty in ePHR communications.

20 Claims, 9 Drawing Sheets

Related U.S. Application Data

(60) Provisional application No. 62/109,503, filed on Jan. 29, 2015.

(56) References Cited

U.S. PATENT DOCUMENTS

| | | | |
|---|---|---|---|
| 2009/0238099 A1 | 9/2009 | Ahmavaara | |
| 2013/0051259 A1* | 2/2013 | Kim | H04L 5/001 370/252 |
| 2014/0133411 A1 | 5/2014 | Park et al. | |
| 2014/0219223 A1 | 8/2014 | Baldemair et al. | |
| 2015/0049705 A1 | 2/2015 | Feuersaenger et al. | |
| 2015/0208402 A1* | 7/2015 | Hwang | H04L 1/1861 370/329 |
| 2018/0007641 A1 | 1/2018 | Vishwanathan et al. | |

FOREIGN PATENT DOCUMENTS

| | | |
|---|---|---|
| JP | 2018504021 A | 2/2018 |
| WO | WO-2011122910 A2 | 10/2011 |
| WO | WO-2012020976 A2 | 2/2012 |
| WO | WO-2013141558 A1 | 9/2013 |
| WO | WO-2016122803 A1 | 8/2016 |

OTHER PUBLICATIONS

"U.S. Appl. No. 15/540,923, Non Final Office Action dated Apr. 11, 2018", 16 pgs.

"U.S. Appl. No. 15/540,923, Notice of Allowance dated Oct. 4, 2018", 7 pgs.

"U.S. Appl. No. 15/540,923, PTO Response to Rule 312 Communication dated Dec. 12, 2018", 2 pgs.

"U.S. Appl. No. 15/540,923, Response filed Jul. 11, 2018 to Non Final Office Action dated Apr. 11, 2018", 10 pgs.

"Details of PHR for carrier aggregation", 3GPP Draft; R2-103558 Details of PHR for Carrier Aggregation, 3rd Generation Partnership Project (3GPP), Mobile Competence Centre ; 650, Route Des Lucioles ; F-06921 Sophia-Antipolis Cedex ; France, vol. RAN WG2, No. Stockholm, Sweden, (Jun. 22, 2010), 5 pgs.

"European Application Serial No. 15880649.7, Extended European Search Report dated Jul. 30, 2018", 11 pgs.

"Indian Application Serial No. 201747020637, Voluntary Amendment filed on Jul. 17, 2017", 8 pgs.

"International Application Serial No. PCT/US2015/066772, International Preliminary Report on Patentability dated Aug. 10, 2017", 15 pgs.

"International Application Serial No. PCT/US2015/066772, International Search Report dated Apr. 11, 2016", 8 pgs.

"International Application Serial No. PCT/US2015/066772, Written Opinion dated Apr. 11, 2016", 13 pgs.

"Introduction of dual Connectivity in MAC", Ericsson: 3GPP Draft; 36321_CR0740R1_(REL-12)_R2-145413, 3rd Generation Partnership Project (3GPP), Mobile Competence Centre ; 650, Route Des Lucioles ; F-06921 Sophia-Antipolis Cedex ; France vol. RAN WG2, No. San Francisco, USA;, (Dec. 19, 2014), 40 pgs.

"Japanese Application No. 2017-530698, Voluntary Amendment filed on Aug. 10, 2017", (W/ English Claims), 9 pgs.

"Korean Application Serial No. 10-2017-7017895, Voluntary Amendment filed on Sep. 4, 2017", (W/ English Claims), 15 pgs.

Mediatek, "Power control problem of multiple PA", R4-123826, 3GPP TSG RAN4 #64 Meeting, (Aug. 6, 2012), 1-3.

ZTE, "Parallel transmission of two types PHR", 36PP Draft; R2-103725 Parallel Transmission of Typei 2 PHR, 3rd Generation Partnership Project (3GPP), Mobile Competence Centre ; 650, Route Des Lucioles ; F-06921 Sophia-Antipolis Cedex ; France, vol. RAN WG2, No. Stockholm, Sweden, (Jun. 22, 2010), 5 pgs.

Mediatek, "Clarification of Pcmax,c value used in PHR for Rel-10," 3GPP TSG RAN WG4 Meeting 3GPPRAN4#58AH, R4-11750, Apr. 11-15, 2011, pp. 1-5.

* cited by examiner

POWER HEADROOM REPORTING WITH CHANNEL SELECTION

PRIORITY CLAIM

This application is a continuation of U.S. patent application Ser. No. 15/540,923, filed Jun. 29, 2017, which is a U.S. National Stage Filing under 35 U.S.C. 371 from International Application No. PCT/US2015/066772, filed Dec. 18, 2015 and published in English as WO 2016/122803 on Aug. 4, 2016, which claims the benefit of priority to U.S. Provisional Patent Application Ser. No. 62/109,503 filed on Jan. 29, 2015, and entitled "RAN1/RAN2: TYPE 2 PHR REPORTING IN PUCCH FORMAT 1B WITH CHANNEL SELECTION", each of which is incorporated herein by reference in its entirety.

TECHNICAL FIELD

Embodiments pertain to systems, methods, and component devices for wireless communications, and particularly to the generation of extended power headroom reports (ePHRs) for long term evolution (LTE), LTE-advanced, and other similar wireless communication systems.

BACKGROUND

LTE-advanced is a standard for wireless communication of high-speed data for user equipment (UE) such as mobile telephones. In LTE-advanced-standard systems and systems related to or derived from LTE standards, the amount of power a UE is allowed to transmit with is limited based on various factors. As part of communications for managing the transmission power of a UE, a power headroom report (PHR) may be used to communicate and manage limits on UE transmission power.

Carrier aggregation is a technology used by LTE-advanced systems where multiple carrier signals may be used to carry communications for a single UE, thus increasing the bandwidth available to a single device.

BRIEF DESCRIPTION OF THE DRAWINGS

FIG. 6B illustrates aspects of intermediate HARQ-ACK operation in a system with early termination of repeated transmissions, according to certain embodiments.

DETAILED DESCRIPTION

Embodiments relate to systems, devices, apparatus, assemblies, methods, and computer readable media to enhance wireless communications, and particularly to communication systems that operate with power headroom reporting and carrier aggregation. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments, and are intended to cover all available equivalents of the elements described.

Figure 1:
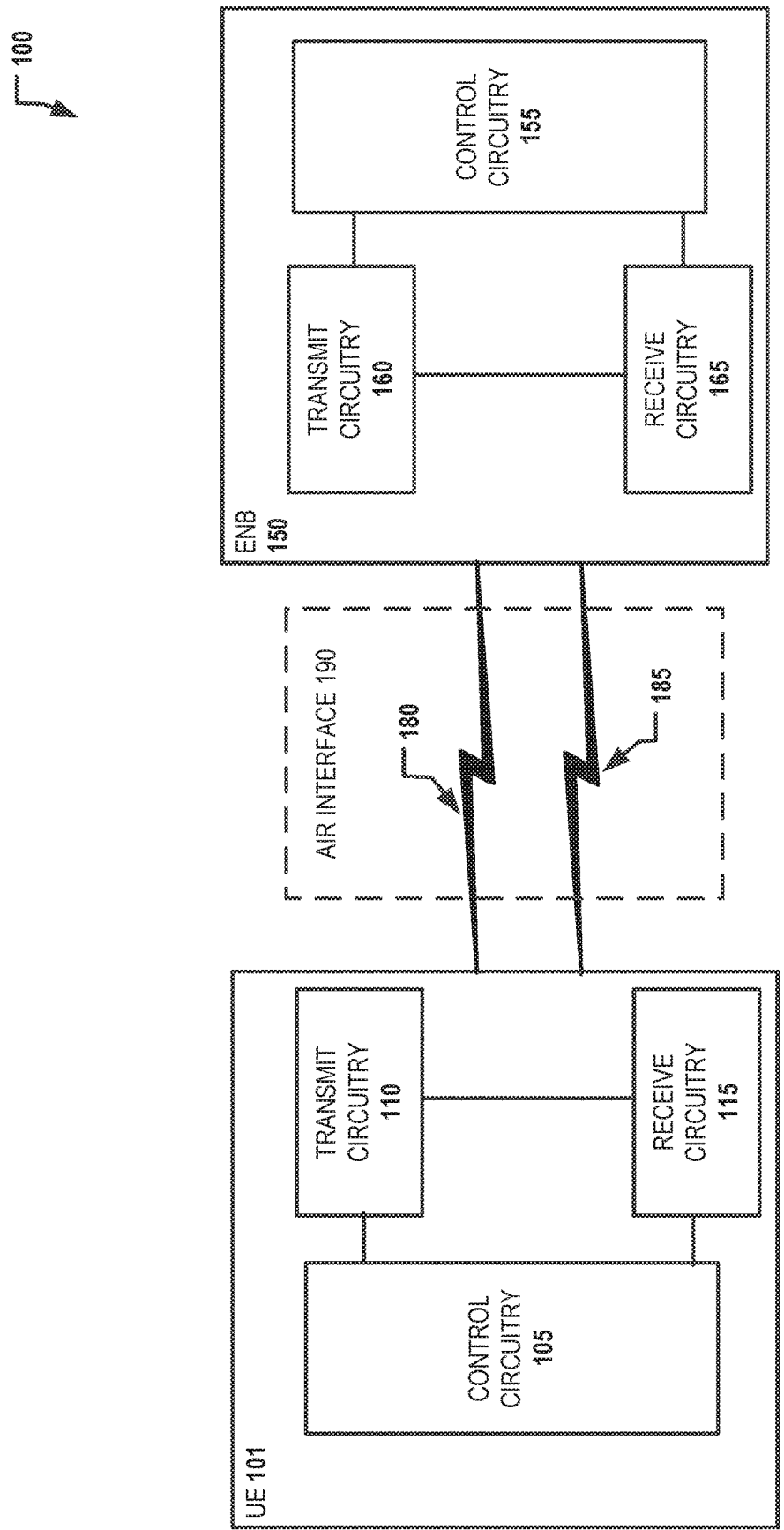
FIG. 1 is a block diagram of a system including an evolved node B (eNB) and user equipment (UE) that may operate according to certain embodiments.

FIG. 1 illustrates a wireless network 100, in accordance with some embodiments. The wireless network 100 includes a UE 101 and an eNB 150 connected via an air interface 190. The UE 101 and eNB 150 communicate using a system that supports carrier aggregation, such that the air interface 190 supports multiple frequency carriers, shown as a component carrier 180 and a component carrier 185. Although two component carriers are illustrated, various embodiments may include two or more component carriers.

The UE 101 and any other UE in the wireless network 100 may be, for example, laptop computers, smartphones, tablet computers, printers, machine-type devices such as smart meters or specialized devices for healthcare monitoring, remote security surveillance, an intelligent transportation system, or any other wireless devices with or without a user interface. The eNB 150 provides network connectivity to a broader network (not shown) to the UE 101 via the air interface 190 in an eNB service area provided by the eNB 150. In some embodiments, such a broader network may be a wide area network operated by a cellular network provider, or may be the Internet. Each eNB service area associated with the eNB 150 is supported by antennas integrated with the eNB 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the eNB 150, for example, includes three sectors each covering a 120 degree area with an array of antennas directed to each sector to provide 360 degree coverage around the eNB 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with wireless communications using carrier aggregation. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according FDM. The transmit circuitry 110 and the receive circuitry 115 may transmit and receive both control data and content data (e.g., messages, images, video, et cetera) structured within data blocks that are carried by the physical channels.

FIG. 1 also illustrates the eNB 150, in accordance with various embodiments. The eNB 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations for managing channels and component carriers used with various UEs. The transmit circuitry 160 and receive circuitry 165 may be adapted to transmit and receive data, respectively, to any UE connected to the eNB 150. The transmit circuitry 160 may transmit the plurality of multiplexed downlink physical channels in a downlink superframe that is comprised of a plurality of downlink subframes. The receive circuitry 165 may receive a plurality of multiplexed uplink physical channels from various UEs. The plurality of uplink physical channels may be multiplexed according to FDM in addition to the use of carrier aggregation.

As mentioned above, the communications across the air interface 190 may use carrier aggregation, where multiple different component carriers 180, 185 can be aggregated to carry information between the UE 101 and eNB 150. Such component carriers 180, 185 may have different bandwidths, and may be used for uplink communications from the UE 101 to the eNB 150, downlink communications from the eNB 150 to the UE 101, or both. Such component carriers 180, 185 may cover similar areas, or may cover different but overlapping sectors. The radio resource control (RRC) connection is handled by only one of the component carriers 180, 185, which may be referred to as the primary component carrier, with the other component carriers referred to as secondary component carriers.

In some embodiments with carrier aggregation, the physical uplink control channel (PUCCH), which is used to communicate various control communications, and the physical uplink shared channel (PUSCH), which is used to for data communications among other communications, may be transmitted simultaneously on different component carriers. This creates uncertainties when physical downlink control channel (PDCCH) information is not associated clearly with PUSCH information, as described in more detail below. Various embodiments described herein thus identify such uncertainties and generate ePHRs based on the uncertainties. An ePHR based on the uncertainty may then accommodate the timing and selection of information for the ePHR in view of the uncertainty issues present in certain carrier aggregation configurations.

In one example embodiment, the UE 101 is configured for an ePHR and simultaneous PUCCH and PUSCH as part of a system configured with carrier aggregation using frequency division duplexing (FDD) and two downlink carriers, and thus the UE 101 is using PUCCH format 1b with channel selection for the hybrid automatic repeat request (HARD) acknowledgement (HARQ-ACK). This is defined by, for example, section 10.1.2 of 3GPP standard 36.213 v10.7.0 published on Sep. 19, 2015, as well as other versions. According to the PUCCH format 1b with channel selection, the exact PUCCH resource used for the HARQ-ACK feedback is a function of decoding the corresponding downlink information from the PDCCH, and in certain cases the PUCCH may be cancelled. This follows from tables 10.1.2.2.1-5 in standard 36.213, where the last entry in the tables specifies no PUCCH transmission. This issue also exists for time division duplexing (TDD) systems when the UE is configured with both PUCCH format 1b with channel selection and ePHR.

According to section 5.1.1.2 of the 3GPP specification TS36.213, a type 2 PHR is calculated based on the conditions. In a first case, if the UE transmits PUSCH simultaneously with PUCCH in subframe I for the primary cell, power headroom for a type 2 report is computed using:

$$PH_{type2}(i) = P_{CMAX,c}(i) - 10 \log_{10} \quad (1)$$

$$\left( 10^{(10 \log_{10}(M_{PUSCH,c}(i)) + P_{O\_PUSCH,c}(j) +} + \right.$$
$$10^{(P_{O\_PUCCH} + PL_c + h(n_{CQI}, n_{HARQ}, n_{SR}) +}$$

$$\left. a_c(j) \cdot PL_c + \Delta_{TF,c}(i) + f_c(i))/10 \right)$$
$$\Delta_{F\_PUCCH}(F) + \Delta_{TxD}(F') + g(i))/10 \right)$$

If the UE transmits PUSCH without PUCCH in subframe I for the primary cell, then power headroom for a type 2 report is computed using:

$$PH_{type2}(i) = P_{CMAX,c}(i) - 10 \log_{10} \quad (2)$$

$$\left( 10^{(10 \log_{10}(M_{PUSCH,c}(i)) + P_{O\_PUSCH,c}(j) +} + \right.$$
$$10^{(P_{O\_PUCCH} + PL_c + g(i))/10}$$

$$\left. a_c(j) \cdot PL_c + \Delta_{TF,c}(i) + f_c(i))/10 \right)$$

If the UE transmits PUCCH without PUSCH in subframe I for the primary cell, then power headroom for a type 2 report is computed using:

$$PH_{type2}(i) = P_{CMAX,c}(i) - 10 \log_{10} \left( \frac{10^{(P_{O\_PUSCH,c}} +}{10^{(P_{O\_PUCCH}}} \right) \quad (3)$$

-continued $$PL_c + h(n_{CQI} \cdot n_{HARQ} \cdot n_{SR}) + \Delta_{P\_PUCCH}(F) + \Delta_{TxD}(F) + g(i))/10$$

$$(1) + a_c(1) \cdot PL_c + f_c(i))/10 +$$

If the UE does not transmit PUCCH or PUSCH in subframe I for the primary cell, then power headroom for a type 2 report is computed using:

$$PH_{type2}(i) = P_{CMAX,c}(i) - 10 \log_{10} \quad (4)$$

$$\left( 10^{(P_{O\_PUSCH,c}(1)+a_c(1)\cdot PL_c+f_c(i))/10} + 10^{(P_{O\_PUCCH}+PL_c+g(i))/10} \right)$$

Thus, as illustrated above, type 2 ePHR calculations are dependent on whether the PUCCH or PUSCH is transmitted or not in subframe I. If the physical downlink shared channel (PDSCH) decoding for a grant associated with a subsequent PUCCH transmission is completed later than the PUSCH packing containing the ePHR, the UE may not know which condition is used for the ePHR calculation.

Tables 1-3 below (from 10.1.2.2.1-3/4/5 of 3GPP standard TS36.213) are shown as part of one potential example. HARQ-ACK(0) and HARQ-ACK(1) correspond, respectively, to primary and secondary cells. When the UE 101 misses the PDCCH for a PDSCH on the primary cell, HARQ-ACK(0) becomes a discontinuous transmission (DTX). If the UE 101 successfully decodes the PDCCH for the PDSCH on the secondary cell and the PDSCH on the secondary cell, HARQ-ACK(1) becomes the corresponding ACK. In this case, the UE 101 transmits the HARQ-ACK using $\{n\_PUCCH,1\}\hat{}(1)\}$ with b(0)b(1)=01. If the UE 101 successfully decodes the PDCCH for the PDSCH on the secondary cell and the PDSCH on the secondary cell, HARQ-ACK(1) becomes a negative ACK. In this case, the UE 101 transmits nothing in the response. Thus, if PDSCH decoding is not completed before packing the PUSCH, then the UE 101 does not know which condition is used for the ePHR calculation in the examples using equations (1) and (2) above. This uncertainty is also present for embodiments with A=3 (e.g., table 10.1.2.2.1-4) and A=4 (e.g., table 10.1.2.2.1-5) for FDD, as well as for other TDD embodiments not specifically illustrated.

TABLE 1

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

TABLE 2

| HARQ-ACK(0) | HARQ-ACK(1) | HARQ-ACK(2) | $n_{PUCCH}^{(1)}$ | b(0)b(1) |
|---|---|---|---|---|
| ACK | ACK | ACK | $n_{PUCCH,1}^{(1)}$ | 1, 1 |
| ACK | ACK | NACK/DTX | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | No Transmission | |

TABLE 3

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | No Transmission | |

Figure 2:
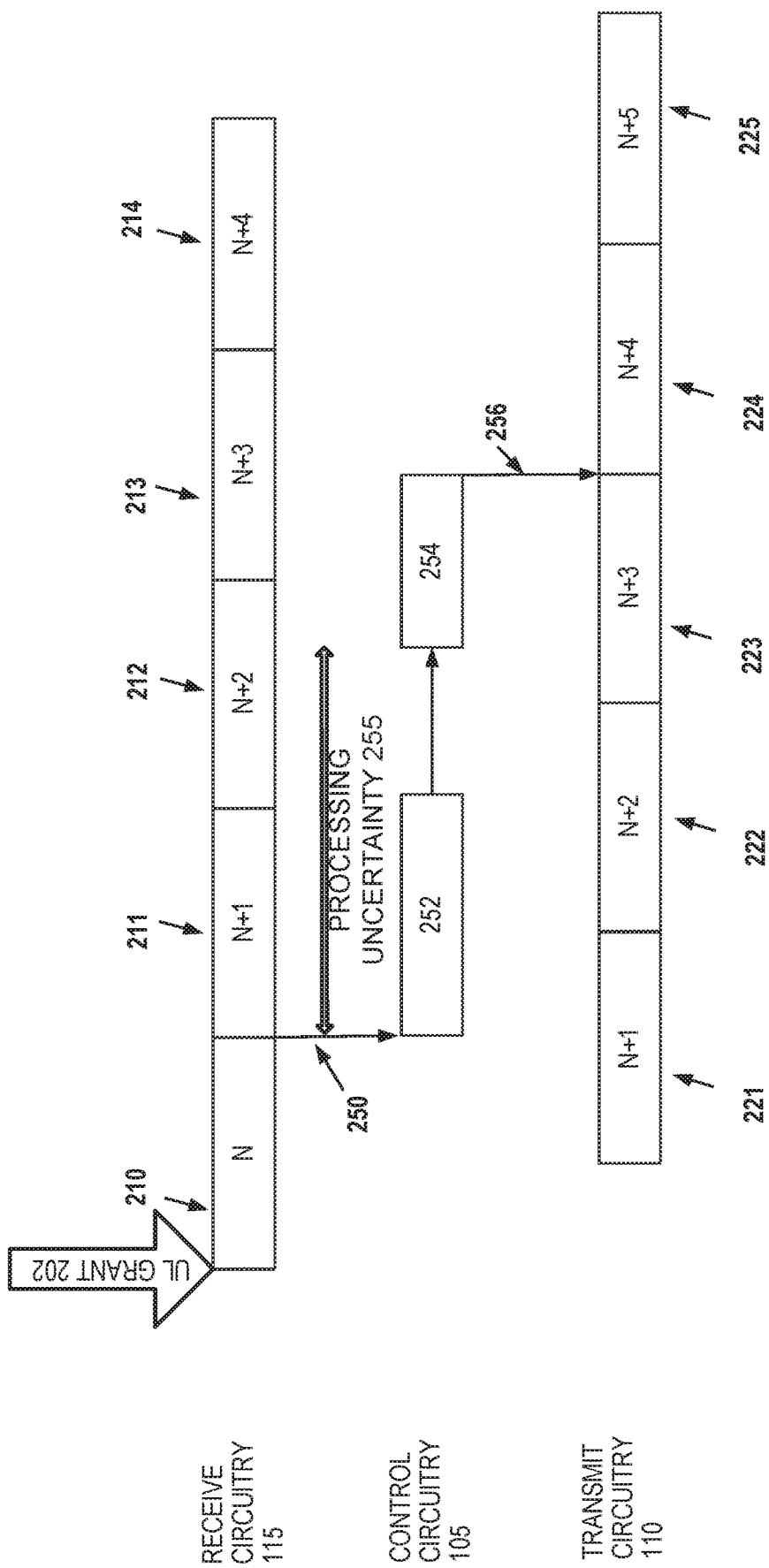
FIG. 2 illustrates aspects of system operation according to certain embodiments.

FIG. 2 illustrates operations occurring at a UE. For the purposes of illustration and convenience, the operations of FIG. 2 are described in the context of FIG. 1, including the UE 101 and the eNB 150. Other embodiments may use other systems and devices.

FIG. 2 shows received subframes 210-214 and transmitted subframes 221-225. As illustrated in FIG. 2, the receive circuitry 115 receives an uplink grant 202 for a subsequent PUSCH transmission from the eNB 150 in subframe 210. The physical layer of the UE 101 passes the received uplink grant to the medium access control (MAC) layer that is part of the control circuitry 105 in operation 250 at the end of subframe 210. Further, since the physical layer expects to send HARQ-ACK feedback after four subframes, the physical layer indicates the presence of a PUCCH transmission to the MAC in operation 250. Based on the uplink scheduling resources for the fourth subframe and the network configuration of the ePHR, the MAC layer determines that the PUSCH four frames later at subframe 224 should carry an ePHR. Accordingly, at the end of received subframe N, shown as subframe 210, operation 252 involves the MAC signaling to upper layers to reserve n octets from the received grant for the ePHR.

TABLE 4

| Octet | C7 | C6 | C5 | C4 | C3 | C2 | C1 | R |
|---|---|---|---|---|---|---|---|---|
| 0 | P | V | | | PH (Type 2) | | | |
| 1 | 0 | 0 | | | $P_{CMAX,c}1$ | | | |
| 2 | P | V | | | PH (Type I PCell) | | | |
| 3 | 0 | 0 | | | PCMAX, c 2 | | | |
| 4 | P | V | | | PH (Type I SCell) | | | |
| 5 | 0 | 0 | | | PCMAX, c 3 | | | |
| ... | | | | | | | | |
| ... | | | | | | | | |
| n − 1 | P | V | | | PH (Type I SCell) | | | |
| n | 0 | 0 | | | PCMAX, c 3 | | | |

Table 4 above shows the octets for certain aspects of an ePHR.

Returning to FIG. 2, as mentioned above, the uplink grant 202 is received as part of a PDCCH communication from the eNB 150 at the receive circuitry 115 in subframe 210. Subframe 210 includes an uplink grant (e.g., downlink control information 0/4) for subframe N+4 (e.g subframe 224) as well as a downlink grant which implies uplink HARQ-ACK feedback in subframe 224. Since the UE 101 is configured with simultaneous PUCCH and PUSCH, the HARQ-ACK feedback is scheduled to be sent over PUCCH in subframe 224.

In operation 252, the MAC portion of the control circuitry 105 starts processing the uplink grant. This processing applies priority as described in section 5.4.3 of 3GPP standard 36.321 and determines that the uplink scheduled resources at subframe 224 (N+4) should carry an ePHR. Since the physical layer indicates HARQ-ACK feedback over PUCCH at subframe 224 (N+4), the MAC further reserves space for octets 1 and 2 in the ePHR as mentioned above as part of operation 252. At the beginning of operation 254, the MAC has been completely prepared along with the ePHR, and thus operation 254 begins with the control circuitry 105 performing encoding and modulation tasks for an uplink transmission on the PUSCH. With uplink carrier aggregation, this PUSCH transmission may occur over a secondary carrier and thus may have additional timing advances associated. The greater the timing advance, the further to the left operation 254 begins. Operation 254 then occurs over time as the information to be transmitted in subframe 224 is processed. The operations 254 include encoding, interleaving, spreading, et cetera. At or before time 256 when subframe 224 is transmitted, operations 254 complete or the associated timing is not met.

Since the MAC processing is to be ready by the beginning of operation 254, the MAC/Level 1(L1) control circuitry processing should have the information about PUCCH resources for uplink transmission useded for operation 254 at the beginning of operation 254 so that an accurate ePHR that matches the transmission for subframe 224 may be generated during operation 254. Further, at operation 252, the MAC is set to reserve space for octets 1 and 2 of the ePHR, since subframe 224 (N+4) is expected to carry a PUCCH. At the beginning of operation 254, however, if MAC/L1 control circuitry 105 processing determines that no "real" PUCCH transmission is to occur at subframe 224 because the HARQ-ACK feedback satisfies the last entry from tables 10.1.2.2.1-3/4/5, then the MAC/L1 control circuitry 105 would be used to rearrange the data to be transmitted in subframe 224 to get rid of the second octet (e.g., the octet containing Pcmax for the type 2 report) and would add a padding octet at the end of the data. In terms of timing, the beginning of operation 254 would be shifted further to the left if the uplink scheduling on the second carrier has a higher advanced timing requirement compared to the primary carrier. This generates processing uncertainty 255 in the timing, where the UE 101 may not be able to gather the information used for subframe 224 in sufficient time for the data to be properly processed at the beginning of operation 254.

Thus, to have an ePHR which is accurately aligned with the actual over-air transmission, the system has restrictions in terms of timing to avoid processing uncertainty 255, where the beginning of operation 254 starts before the necessary information is available. The restrictions include the structures for HARQ-ACK feedback results to be known by the beginning of operation 254 in order for the PUCCH resource values to be set in time for the transmission of subframe 224, as well as the structures for the MAC processing to rearrange the data to remove the second octet in the case where the PUCCH is not to be transmitted by the transmit circuitry 110. These together impose restrictions on the downlink decoding necessary for MAC processing interactions to determine whether the second octet should be adjusted.

Figure 3:
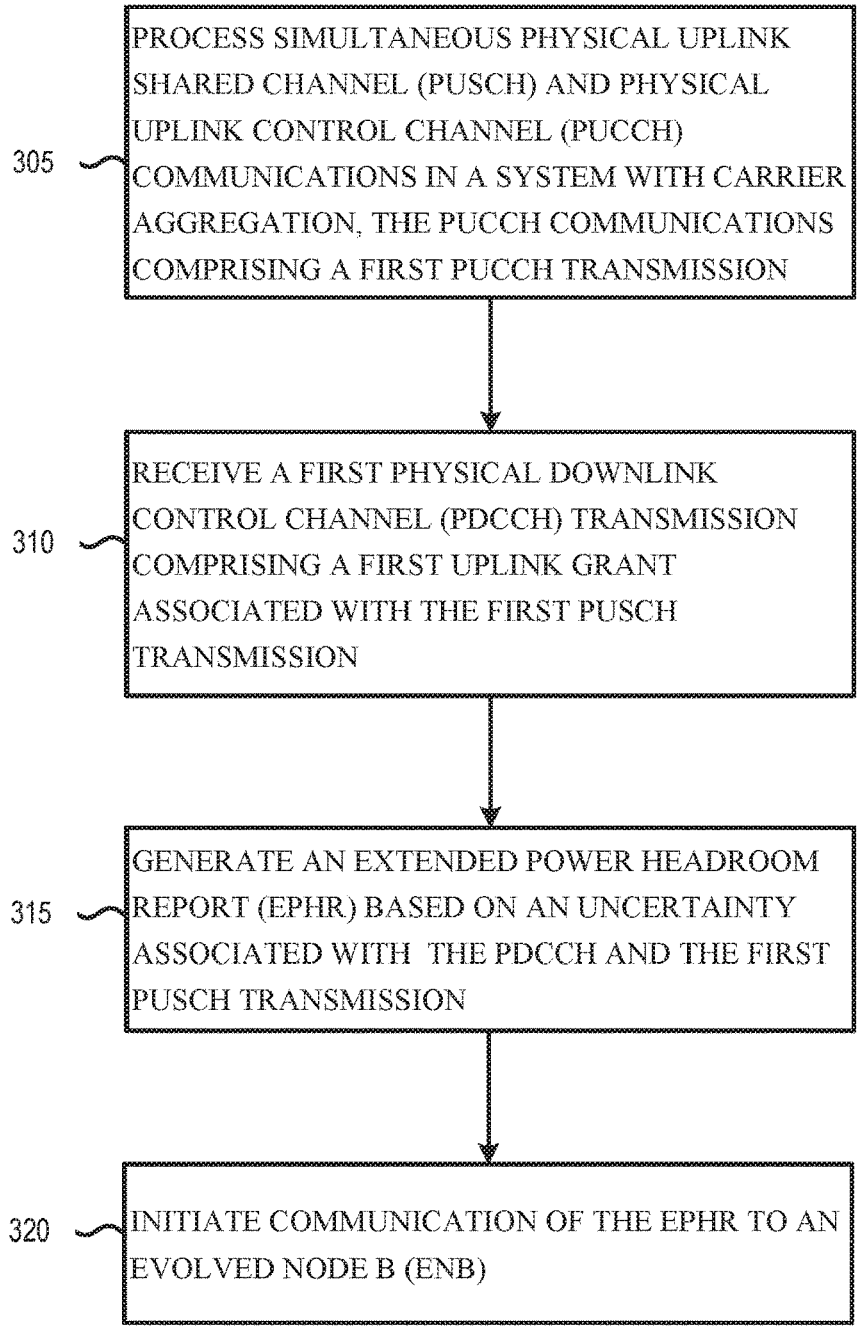
FIG. 3 describes a method for uplink grants with unlicensed channels according to some example embodiments.

FIG. 3 describes a method 300 for managing the uncertainty described above as processing uncertainty 255. The method 300 is a method performed by a UE, an apparatus of a UE, or circuitry of a UE such as one or more processors that make up processing circuitry of a UE, such as an integrated circuit that implements MAC processing as part of a UE. Such an apparatus, set of control circuitry, or set of circuit systems in a UE are configured to process simultaneous PUSCH and PUCCH communications as part of operation 305. As described above, for a UE this is part of carrier aggregation, which may be implemented as part of LTE-advanced standards. In the method 300, the PUCCH communications comprise a first PUCCH transmission such as the transmission associated with subframe 224 discussed above.

In operation 310, the UE receives a first PDCCH transmission comprising a first uplink grant associated with the first PUSCH transmission. An example of this transmission of operation 310 is described above with respect to the uplink grant 202 received at the receive circuitry 115 as part of the data in subframe 210.

An ePHR is then generated as part of operation 315, with the ePHR generated based on an uncertainty associated with the PDCCH transmission. This is seen in association with processing uncertainty 255, where the PDCCH information from subframe 210 processed during operations 250 and 252 is not clearly able to provide the correct information due to the timing issues with the second octet of the ePHR and the timing of a secondary carrier for subframe 224 as part of the PUSCH transmission for the uplink grant.

In operation 320, then, communication of the ePHR is initiated from the UE 101 to the eNB 150 using the ePHR generated based on the uncertainty within the system.

Figure 4:
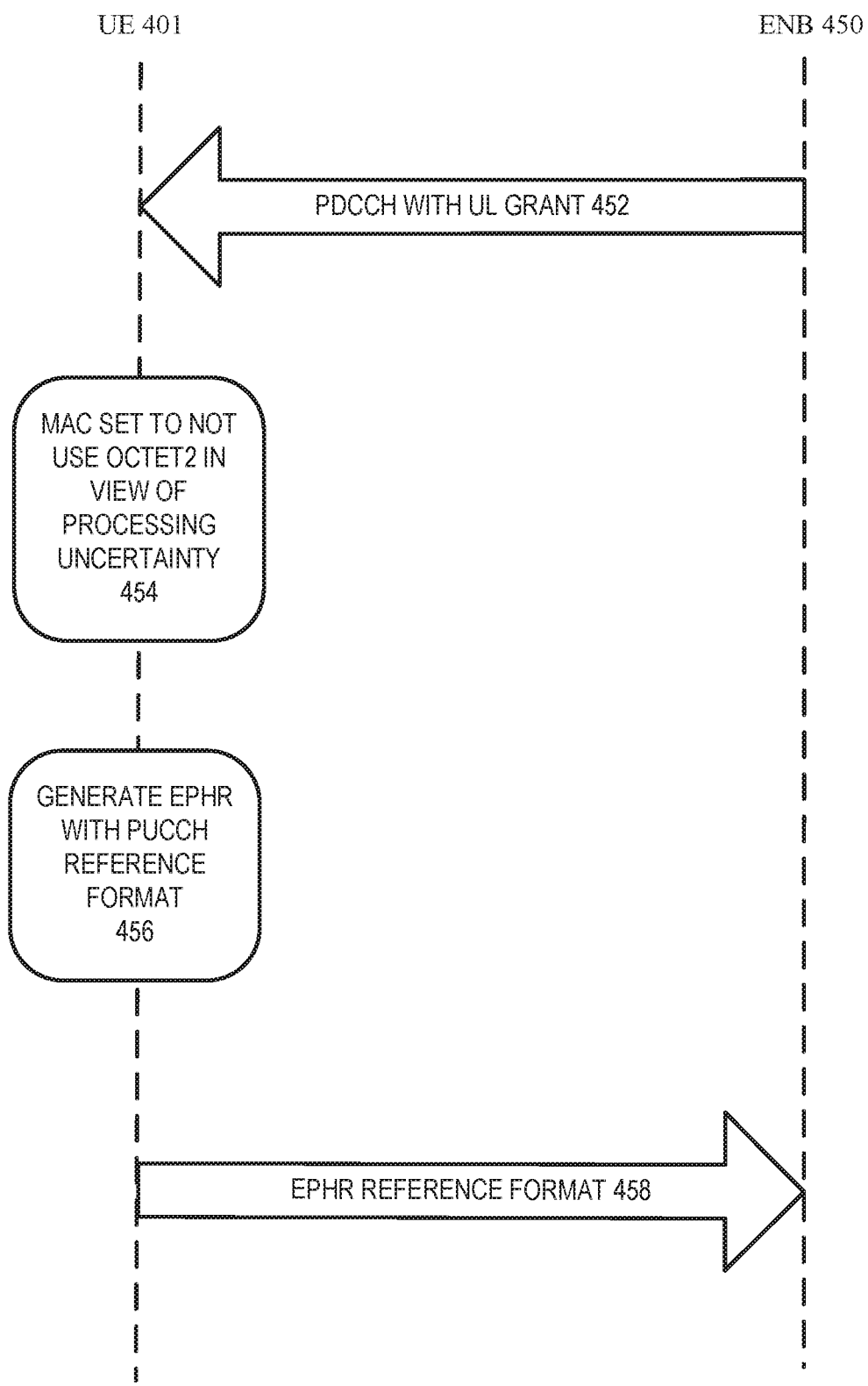
FIG. 4 illustrates aspects of uplink grant operation with unlicensed channels according to some example embodiments.

The ePHR may be generated to deal with the uncertainty described above in a variety of different ways. FIG. 4 illustrates aspects of some embodiments where the ePHR is generated based on the uncertainty associated with the PDCCH transmission associated with a first PUSCH transmission by using a structure which does not reserve space for octet 2 regardless of whether octet 2 is called for. Thus, as illustrated in FIG. 4, an eNB 450 communicates a PDCCH with an uplink grant to a UE 401 in operation 452. At the UE 401, the control circuitry determines that the settings are such that an uncertainty is created as described above (e.g., processing uncertainty 255). The UE 401 is structured to deal with this uncertainty by not reserving space for octet 2 in the ePHR as part of operation 454. In operation 456, the UE 401 generates an ePHR with a PUCCH reference format regardless of whether octet 2 is called for, and the ePHR is communicated from the UE 401 to the eNB 450 in operation 458.

In some such embodiments, the MAC/L1 processing circuitry of the UE 401 always sets a V=1 in octet 1 of the ePHR, which is the octet with the type 4 report. In such embodiments, the ePHR is thus set in a PUCCH reference format according to equation 4 listed above. The uncertainty is thus dealt with by simply choosing one option, and this eases the implementation requirements on the UE 401 since the downlink decoding results are not used for the PUSCH associated with the PDCCH and UL grant in operation 452. Additionally, the MAC/L1 circuitry of the UE 401 does is not used to shift the data octets in the case where no PUCCH transmission is to occur and insert padding at the end of the ePHR. Thus, in embodiments as described in FIG. 4, the type 2 report is calculated for a reference PUCCH transmission even if a real PUCCH is sent in subframe N+4 with the ePHR in operation 458. In other words, as described above, uncertainty exists as to whether a PUCCH transmission will be sent alongside PUSCH data associated with the uplink grant from operation 452 when the system is structured for carrier aggregation as described above. In embodiments operating as described in FIG. 4, this uncertainty would typically impact the ePHR, but because the UE 401 is structured to generate the ePHR based on an awareness of this uncertainty, the UE 401 is set to ignore the PUCCH, which may or may not be present. Instead, a reference ePHR is always used. The usage of the reference PUCCH format for a type 2 report then occurs when the PUCCH format 1b with channel selection coincides with an uplink scheduled to contain an ePHR. In other embodiments, the UE 401 could base the type 2 report on a real PUCCH transmission when the resources for scheduling request (SR) and channel quality indication (CQI) reporting are known in advance.

Figure 5:
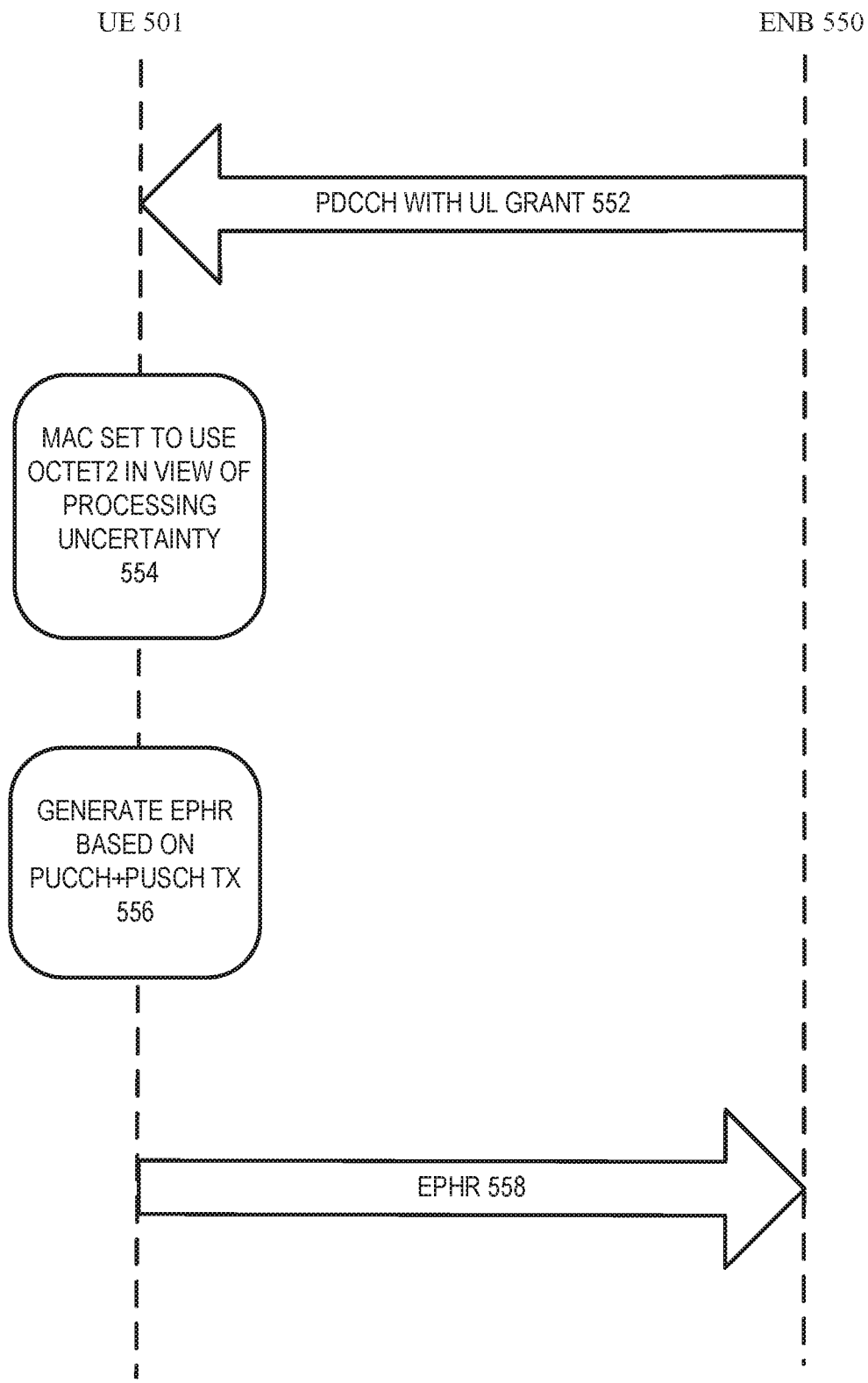
FIG. 5 illustrates aspects of uplink grant operation with unlicensed channels according to some example embodiments.

FIG. 5 illustrates aspects of another embodiment. Unlike the embodiment of FIG. 4 where the MAC does not reserve space for octet 2, in the embodiment of FIG. 5 the MAC of a UE 501 resolves the uncertainty (e.g., processing uncertainty 255) by reserving space for octet 2 regardless of the actual status. Thus, in the embodiment of FIG. 5, an eNB 550 communicates a PDCCH with an uplink grant in operation 522 in a system with carrier aggregation allowing simultaneous communication of PUSCH and PUCCH channels. The control circuitry of the UE 501 receives the PDCCH, and the MAC circuitry is set to use octet 2 in view of the processing uncertainty in operation 554. In operation 556, an ePHR is generated based on a possible simultaneous PUCCH and PUSCH transmission regardless of whether the uncertainty is resolved prior to the transmission(s). This ePHR is then communicated from the UE 501 to the eNB 550 in operation 558.

In such embodiments, the MAC/L1 circuitry of the UE 501 clears the V bit in octet 1 and reserves space for octet 2 in the ePHR. Further, the MAC/L1 circuitry calculates the ePHR assuming a real PUCCH transmission based on a fixed PUCCH resource from the set of resources possible for PUCCH format 1b with channel selection. Such resources will be known to the UE 501 when the PDCCH is received in operation 552. Either the resource can be always fixed to a resource 0 or the UE 501 can select a resource depending on the subframe. In one potential example, a resource is set to mod (subframe, A) where A is the number of PUCCH resources in section 10.1.2.2.1 of 3GPP 36.213 discussed above. Thus, in the embodiment of FIG. 5, the UE 501 includes octet 2 containing the Pcmax associated with the type 2 report. This is the case even if no PUCCH transmission occurs due to HARQ-ACK feedback satisfying the transmission entry of table 10.1.2.2.1-3/4/5 from 3GPP 36.213. In such embodiments, then, the UE 501 reserves space for octet 2 whenever PUCCH format 1b with channel selection coincides with an ePHR and where the UE 501 uses a fixed rule known to the eNB 550 which is independent of the HARQ-ACK feedback results for calculating the resource and type 2 ePHR.

Such embodiments as described in FIG. 5 provide an advantage in that the eNB 550 receives a type 2 report based on a PUCCH transmission instead of a reference. Such a report includes the octet containing the Pcmax associated with the type 2 report. Thus, the eNB 550 receives an accurate picture of the UE 501 power back-off due to maximum power reduction (MPR) when simultaneous PUCCH and PUSCH transmission occurs at the UE 501. Further, the type 2 report provides the eNB 550 with awareness of the exact PUCCH resource set for use by the UE 501 in the calculation, since the resource used is based on a fixed formula which does not involve the HARQ-ACK feedback bits. The embodiment of FIG. 5 also eases the timing requirements discussed with respect to FIG. 2, since the system does not wait for the uncertainty to be resolved, but simply structures the use of a type 2 report regardless of the uncertainty. The downlink decoding results are thus not used and the data does not have to be adjusted for encoding with the timing as described with respect to operations 254 and processing uncertainty 255 in FIG. 2.

Figure 6:
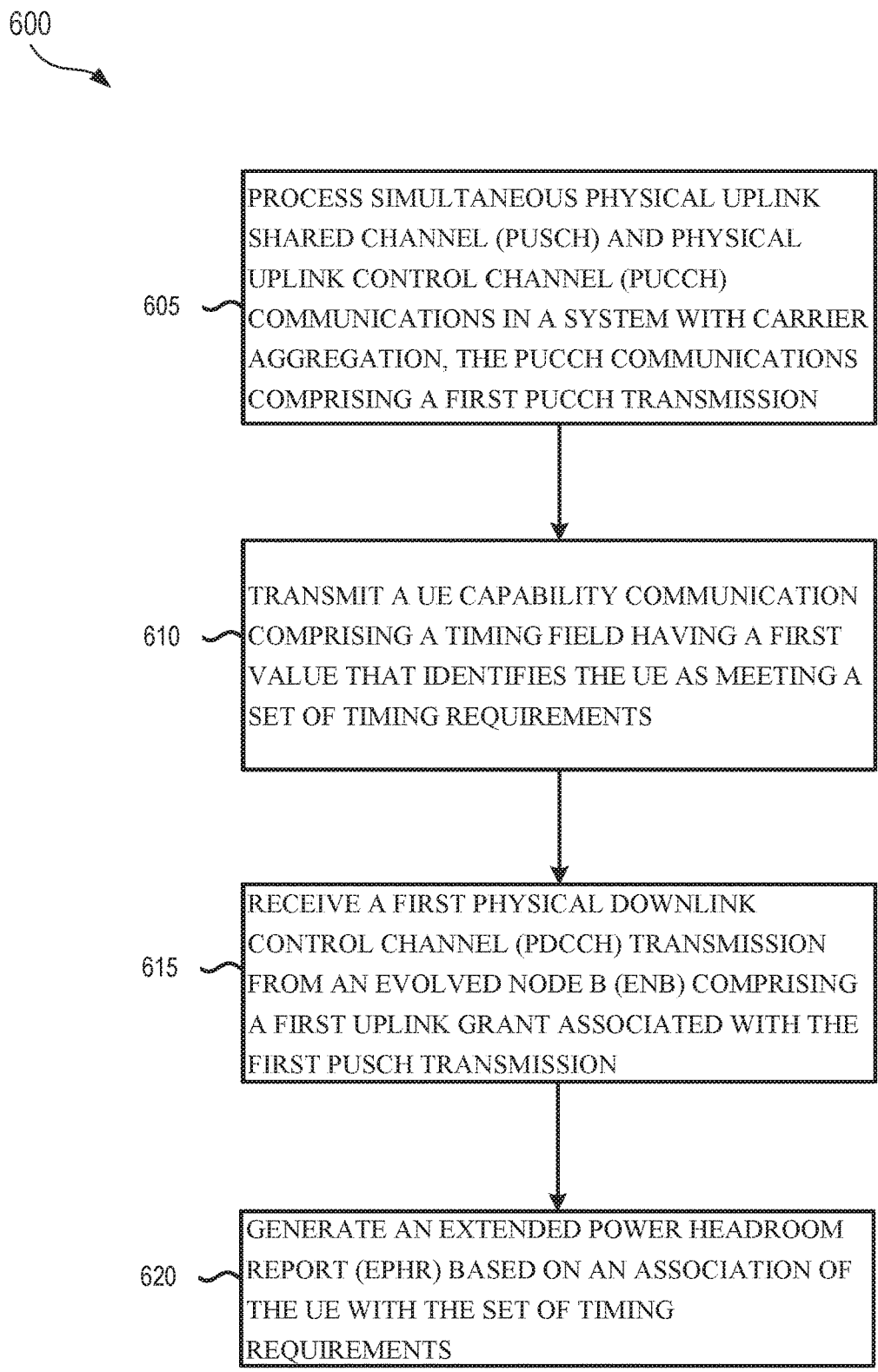
FIG. 6 describes a method for uplink grants with unlicensed channels according to some example embodiments.

In addition to the embodiments described above with respect to FIGS. 2-5, where an ePHR is generated based on an uncertainty, certain embodiments may determine that the control circuitry of a UE is capable of always resolving the uncertainty with sufficient time to appropriately decide on the correct ePHR and encode the correct data for transmission at a granted uplink. FIG. 6 illustrates a method 600 for such a UE. In the embodiment of the method 600, a UE is configured to process simultaneous PUSCH and PUCCH communications (e.g., use carrier aggregation) as part of an initial configuration, at operation 605. In operation 610, the UE transmits a capability communication to an eNB, where the capability communication includes a timing field having a first value that identifies the UE as meeting a set of timing requirements. The timing requirements are associated with the timing described in FIG. 2, such that the timing is sufficient to guarantee that a processing uncertainty 255 does not occur. In other words, the delays within the circuitry of the UE performing the method 600 are such that the UE is capable of processing the PDCCH uplink grant and encoding all of the necessary information for the uplink communications without concern that the timing will generate an uncertainty or cause delays in data availability for the uplink grant. The UE then receives a PDCCH transmission in operation 615 with a first uplink grant, and in operation 620, the control circuitry of the UE processes the PDCCH transmission and generates an ePHR based on the set of timing requirements. In some embodiments, if the UE then determines that it is unable to processes the PDCCH with sufficient time to encode the appropriate data for the uplink grant, then the value may be adjusted for the timing field to indicate that the UE does not meet the timing requirements. Depending on the system settings, the UE may then proceed using the embodiment of FIG. 4 or the embodiment of FIG. 5 to resolve the uncertainty and generate an ePHR based on the uncertainty given the UE's inability to meet the timing requirements.

In various embodiments, the methods, apparatus, non-transitory media, computer program products, or other implementations maybe be presented as example embodiments in accordance with the descriptions provided above. Certain embodiments may include UEs such as phones, tablets, mobile computers, or other such devices. Some embodiments may be integrated circuit components of such devices, such as circuits implementing MAC and/or L1 processing on an integrated circuit. In some embodiments, functionality may be on a single chip or multiple chips in an apparatus. Some such embodiments may further include transmit and receive circuitry on integrated or separate circuits, with antennas that are similarly integrated or separate structures of a device. Any such components or circuit elements may similarly apply to eNB embodiments described herein.

Example 1 is an apparatus of a user equipment (UE), the apparatus comprising: control circuitry configured to: process simultaneous physical uplink shared channel (PUSCH) and physical uplink control channel (PUCCH) communications in a system with carrier aggregation, the PUCCH communications comprising a first PUCCH transmission; receive a first physical downlink control channel (PDCCH) transmission comprising a first uplink grant associated with the first PUSCH transmission; generate an extended power headroom report (ePHR) based on an uncertainty associated with the first PDCCH transmission associated with the first PUSCH transmission; and initiate communication of the ePHR to an evolved node B (eNB).

In Example 2, the subject matter of Example 1 optionally includes the apparatus further comprising: receive circuitry configured to receive the first PDCCH transmission from the eNB via an air gap and to communicate the first PDCCH transmission to the control circuitry; and transmit circuitry configured to transmit the PUSCH communications using a first carrier frequency and to transmit the PUCCH communications using a second carrier frequency as part of the system with carrier aggregation.

In Example 3, the subject matter of any one or more of Examples 1-2 optionally includes embodiments wherein the first PUCCH transmission comprises a format 1b transmission with channel selection.

In Example 4, the subject matter of any one or more of Examples 1-3 optionally includes embodiments wherein the ePHR comprises a type 2 report.

In Example 5, the subject matter of any one or more of Examples 1-4 optionally includes embodiments wherein the ePHR is generated based on the uncertainty associated with the first PDCCH transmission associated with the first PUSCH transmission by calculating a power headroom using:

$$PH_{type2}(i) = P_{CMAX,c}(i) - 10 \log_{10} \left( 10^{(10 \log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{O\_PUCCH} + PL_c + g(i))/10} \right) [dB]$$

Some further embodiments operate wherein the circuitry comprises media access control (MAC) circuitry, wherein the MAC circuitry is configured to not reserve space for octet 2 of the ePHR as part of the generation of the ePHR based on the uncertainty associated with first PDCCH transmission associated with the first PUSCH transmission.

In Example 6, the subject matter of any one or more of Examples 1-5 optionally includes embodiments wherein the circuitry is further configured to set a V=1 value in octet 1 of the ePHR as part of the generation of the ePHR based on the uncertainty associated with the first PDCCH transmission associated with the first PUSCH transmission.

In Example 7, the subject matter of any one or more of Examples 1-6 optionally includes embodiments wherein the circuitry is further configured to calculate a reference type 2 report for a reference PUCCH transmission in place of the first PUCCH transmission for use in the ePHR.

In Example 8, the subject matter of any one or more of Examples 3-7 optionally includes embodiments wherein the circuitry comprises media access control (MAC) circuitry, wherein the MAC circuitry is configured to reserve space for octet 2 of the ePHR as part of the generation of the ePHR based on the uncertainty associated with the first PDCCH transmission associated with the first PUSCH transmission.

In Example 9, the subject matter of Example 8 optionally includes embodiments wherein the circuitry is further configured to clear the V in octet 1 of the ePHR as part of the generation of the ePHR based on the uncertainty associated with the first PDCCH transmission associated with the first PUSCH transmission.

In Example 10, the subject matter of any one or more of Examples 1-9 optionally includes embodiments wherein the circuitry is further configured to calculate the ePHR based on a PUCCH transmission associated with a fixed PUCCH resource from a set of possible PUCCH format 1b with channel selection resources.

In Example 11, the subject matter of any one or more of Examples 1-10 optionally includes embodiments wherein the fixed PUCCH resource is resource 0.

In Example 12, the subject matter of any one or more of Examples 1-11 optionally includes embodiments wherein the fixed PUCCH resource is set based on a subframe of the PUCCH transmission associated with the fixed PUCCH resource.

In Example 13, the subject matter of any one or more of Examples 1-12 optionally includes embodiments wherein the ePHR is based on the first PUCCH transmission.

In Example 14, the subject matter of any one or more of Examples 1-13 optionally includes embodiments wherein the circuitry is further configured to transmit a UE capability communication comprising a timing field having a first value that identifies the UE as failing to meet a set of timing requirements; and wherein the uncertainty associated with the PDCCH transmission associated with the first PUSCH transmission is based on the first value.

In Example 15, the subject matter of any one or more of Examples 1-14 optionally includes embodiments wherein the circuitry is further configured to: adjust the first value to a second value that identifies the UE as meeting the set of timing requirements based on a change in UE operation after generation of the ePHR; and generate an extended power headroom report (ePHR) based on the second value.

Example 16 is a non-transitory computer readable medium comprising instructions that, when executed by one or more processors, configure a user equipment (UE) to: process physical uplink shared channel (PUSCH) transmissions on a first carrier frequency simultaneous with physical uplink control channel (PUCCH) communications on a second carrier frequency in a system with carrier aggregation, the PUCCH communications comprising a first PUCCH transmission; receive a first physical downlink control channel (PDCCH) transmission comprising a first uplink grant associated with the first PUSCH transmission; generate an extended power headroom report (ePHR) based on an uncertainty associated with the first PDCCH transmission associated with the first PUSCH transmission; and initiate communication of the ePHR to an evolved node B (eNB).

In Example 17, the subject matter of Example 16 optionally includes embodiments wherein the ePHR comprises a type 2 report; and wherein the ePHR is generated based on the uncertainty associated with the first PDCCH transmission associated with the first PUSCH transmission by calculating a power headroom using:

$$PH_{type2}(i) = P_{CMAX,c}(i) - 10 \log_{10} \left( 10^{(10 \log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{O\_PUCCH} + PL_c + g(i))/10} \right) [dB].$$

Example 18 is an apparatus of a user equipment (UE), the apparatus comprising circuitry configured to: process simultaneous physical uplink shared channel (PUSCH) and physical uplink control channel (PUCCH) communications in a system with carrier aggregation, the PUCCH communications comprising a first PUCCH transmission; transmit a UE capability communication comprising a timing field having a first value that identifies the UE as meeting a set of timing requirements; receive a first physical downlink control channel (PDCCH) transmission from an evolved node B (eNB) comprising a first uplink grant associated with the first PUSCH transmission; generate an extended power headroom report (ePHR) based on an association of the UE with the set of timing requirements; and initiate communication of the ePHR to the eNB.

In Example 19, the subject matter of any one or more of Examples any example above that optionally includes embodiments wherein the circuitry is further configured to: adjust the first value to a second value that identifies the UE as failing to meet the set of timing requirements based on a change in UE operation after generation of the ePHR; receive a second PDCCH transmission comprising a second uplink grant associated with a second PUSCH transmission following generation of the ePHR; generate a second ePHR based on an uncertainty associated with the first PUSCH transmission; and manage communication of the second ePHR to the eNB.

Example 20 is an apparatus of an evolved node B (eNB), the apparatus comprising: receive circuitry configured to receive simultaneous physical uplink shared channel (PUSCH) and physical uplink control channel (PUCCH) communications from a first user equipment (UE) in a system with carrier aggregation, the PUCCH communications comprising a first PUCCH transmission; transmit circuitry configured to transmit a first physical downlink control channel (PDCCH) transmission comprising a first uplink grant associated with the first PUSCH transmission; and control circuitry configured to process an extended power headroom report (ePHR) from the first UE, wherein the ePHR is generated at the first UE based on an uncertainty associated with the first PDCCH transmission associated with the first PUSCH transmission.

In Example 21, the subject matter of Example 20 optionally includes embodiments wherein the eNB is further configured to: receive a UE capability communication from the first UE, the UE capability communication comprising a timing field having a first value indicating that the first UE does not meet a set of timing requirements; and configure the control circuitry to process the ePHR from the first UE based on the first value.

Further, in addition to the specific combinations of examples described above, any of the examples detailing further implementations of an element of an apparatus or medium may be applied to any other corresponding apparatus or medium, or may be implemented in conjunction with another apparatus or medium. Thus, each example above may be combined with each other example in various ways both as implementations in a system and as combinations of elements to generate an embodiment from the combination of each example or group of examples. For example, any embodiment above describing a transmitting device will have an embodiment that receives the transmission, even if such an embodiment is not specifically detailed. Similarly, methods, apparatus examples, and computer readable medium examples may each have a corresponding example of the other type even if such examples for every embodiment are not specifically detailed.

Figure 7:
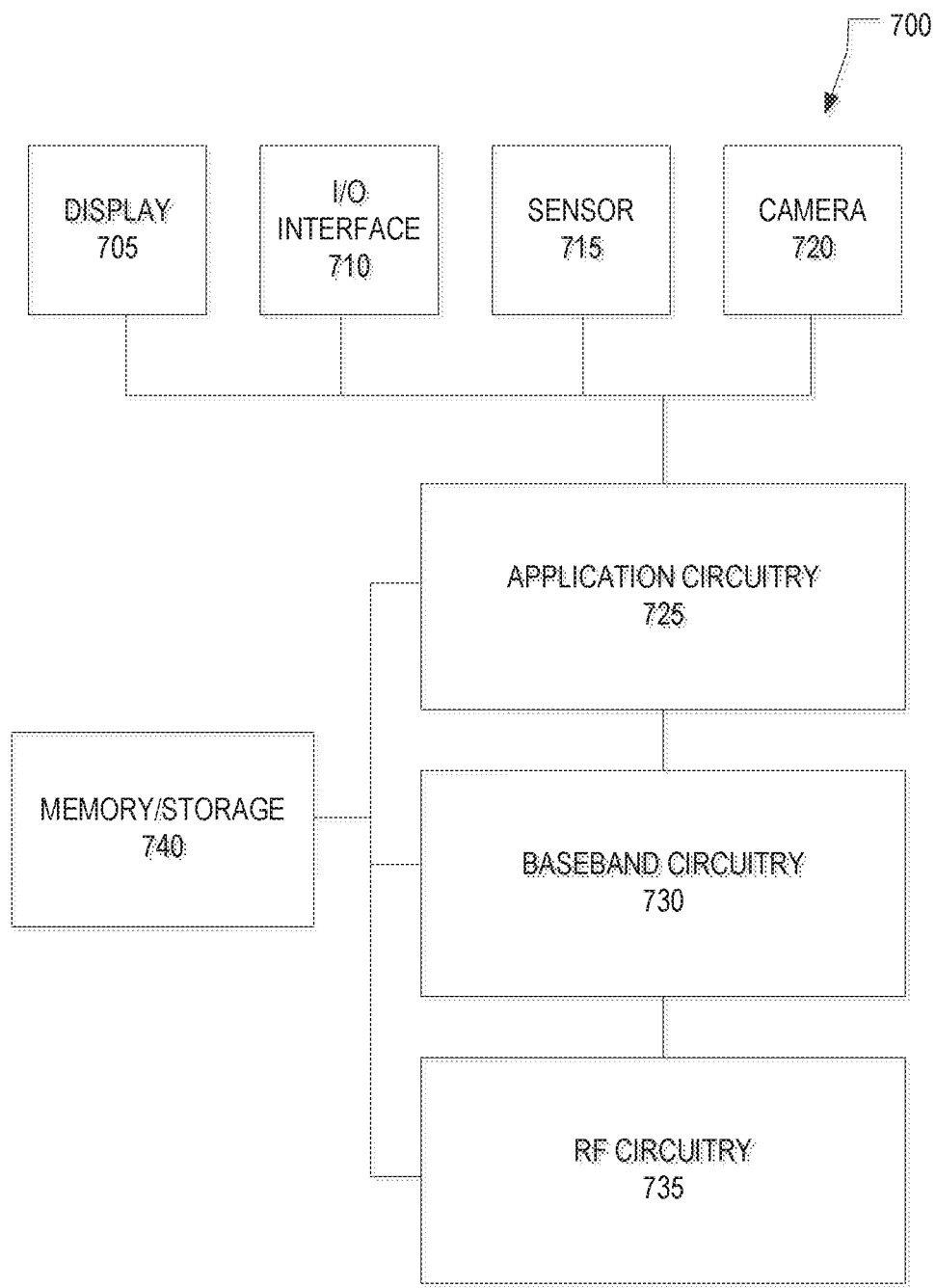
FIG. 7 illustrates aspects of a computing machine, according to some example embodiments.

FIG. 7 illustrates aspects of a computing machine according to some example embodiments. Embodiments described herein may be implemented in a system 700 using any suitably configured hardware and/or software. FIG. 7 illustrates, for some embodiments, an example system 700 comprising radio frequency (RF) circuitry 735, baseband circuitry 730, application circuitry 725, memory/storage 740, a display 705, a camera 720, a sensor 715, and an input/output (I/O) interface 710, coupled with each other at least as shown.

The application circuitry 725 may include circuitry such as, but not limited to, one or more single-core or multi-core processors. The processor(s) may include any combination of general-purpose processors and dedicated processors (e.g., graphics processors, application processors, etc.). The processors may be coupled with the memory/storage 740 and configured to execute instructions stored in the memory/storage 740 to enable various applications and/or operating systems running on the system 700.

The baseband circuitry 730 may include circuitry such as, but not limited to, one or more single-core or multi-core processors. The processor(s) may include a baseband processor. The baseband circuitry 730 may handle various radio control functions that enable communication with one or more radio networks via the RF circuitry 735. The radio control functions may include, but are not limited to, signal modulation, encoding, decoding, radio frequency shifting, and the like. In some embodiments, the baseband circuitry 730 may provide for communication compatible with one or more radio technologies. For example, in some embodiments, the baseband circuitry 730 may support communication with an evolved universal terrestrial radio access network (EUTRAN), other wireless metropolitan area networks (WMANs), a wireless local area network (WLAN), or a wireless personal area network (WPAN). Embodiments in which the baseband circuitry 730 is configured to support radio communications of more than one wireless protocol may be referred to as multi-mode baseband circuitry.

In various embodiments, the baseband circuitry 730 may include circuitry to operate with signals that are not strictly considered as being in a baseband frequency. For example, in some embodiments, the baseband circuitry 730 may include circuitry to operate with signals having an intermediate frequency, which is between a baseband frequency and a radio frequency.

The RF circuitry 735 may enable communication with wireless networks using modulated electromagnetic radiation through a non-solid medium. In various embodiments, the RF circuitry 735 may include switches, filters, amplifiers, and the like to facilitate the communication with the wireless network.

In various embodiments, the RF circuitry 735 may include circuitry to operate with signals that are not strictly considered as being in a radio frequency. For example, in some embodiments, the RF circuitry 735 may include circuitry to operate with signals having an intermediate frequency, which is between a baseband frequency and a radio frequency.

In various embodiments, the transmitter circuitry or receiver circuitry discussed above with respect to the UE 101 or eNB 150 may be embodied in whole or in part in one or more of the RF circuitry 735, the baseband circuitry 730, and/or the application circuitry 725.

In some embodiments, some or all of the constituent components of a baseband processor may be used to implement aspects of any embodiment described herein. Such embodiments may be implemented by the baseband circuitry 730, the application circuitry 725, and/or the memory/storage 740, or may be implemented together on a system on a chip (SOC).

The memory/storage 740 may be used to load and store data and/or instructions, for example, for the system 700. The memory/storage 740 in one embodiment may include any combination of suitable volatile memory (e.g., dynamic random access memory (DRAM)) and/or non-volatile memory (e.g., flash memory).

In various embodiments, the I/O interface 710 may include one or more user interfaces designed to enable user interaction with the system 700 and/or peripheral component interfaces designed to enable peripheral component interaction with the system 700. User interfaces may include, but are not limited to, a physical keyboard or keypad, a touchpad, a speaker, a microphone, and so forth. Peripheral component interfaces may include, but are not limited to, a non-volatile memory port, a universal serial bus (USB) port, an audio jack, and a power supply interface.

In various embodiments, the sensors 715 may include one or more sensing devices to determine environmental conditions and/or location information related to the system 700. In some embodiments, the sensors 715 may include, but are not limited to, a gyro sensor, an accelerometer, a proximity sensor, an ambient light sensor, and a positioning unit. The positioning unit may also be part of, or interact with, the baseband circuitry 730 and/or RF circuitry 735 to communicate with components of a positioning network (e.g., a global positioning system (GPS) satellite). In various embodiments, the display 705 may include a display (e.g., a liquid crystal display, a touch screen display, etc.).

In various embodiments, the system 700 may be a mobile computing device such as, but not limited to, a laptop computing device, a tablet computing device, a netbook, an ultrabook, a smartphone, and the like. In various embodiments, the system 700 may have more or fewer components, and/or different architectures.

Figure 8:
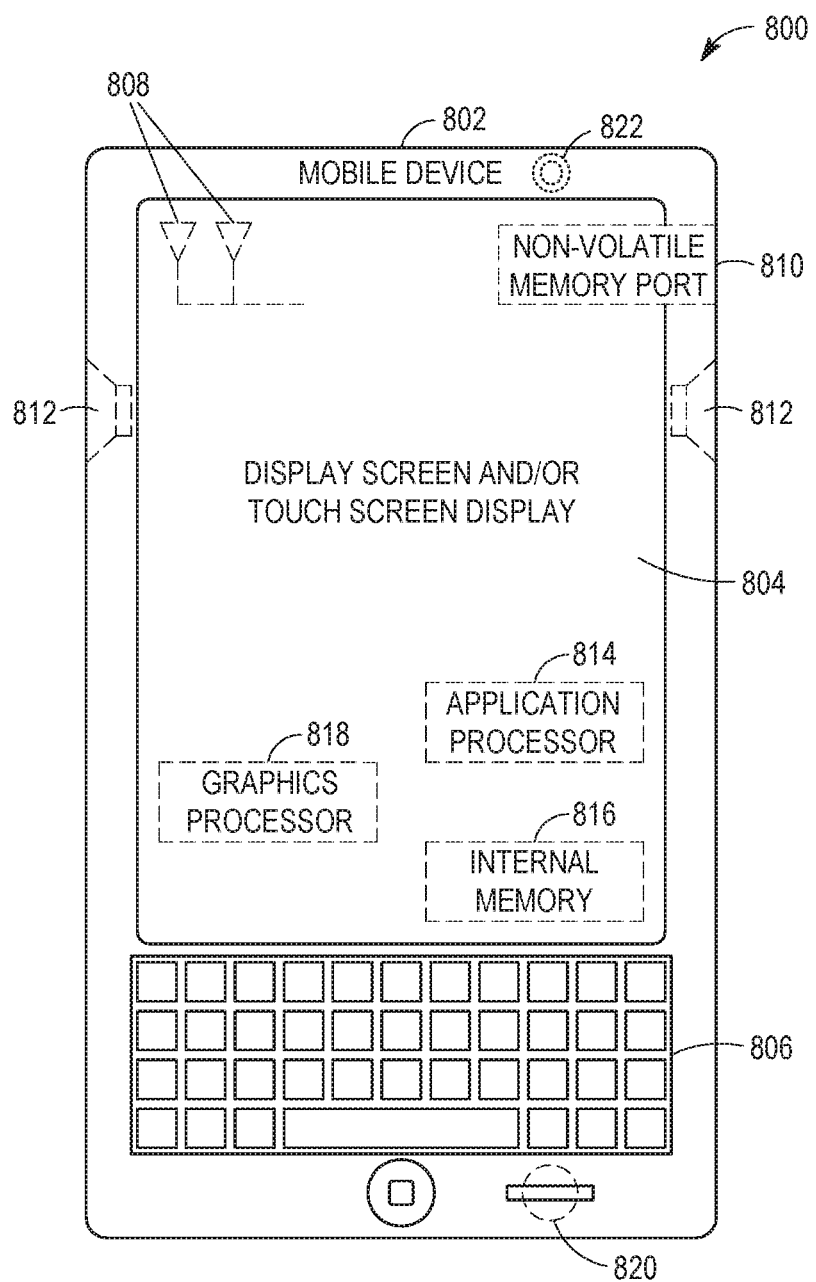
FIG. 8 illustrates aspects of a UE, in accordance with some example embodiments.

FIG. 8 shows an example UE, illustrated as a UE 800. The UE 800 may be an implementation of the UE 101, the eNB 150, or any device described herein. The UE 800 can include one or more antennas configured to communicate with a transmission station, such as a base station (BS), an eNB, or another type of wireless wide area network (WWAN) access point. The UE 800 can be configured to communicate using at least one wireless communication standard including 3GPP LTE, WiMAX, High Speed Packet Access (HSPA), Bluetooth, and WiFi. The UE 800 can communicate using separate antennas for each wireless communication standard or shared antennas for multiple wireless communication standards. The UE 800 can communicate in a WLAN, a WPAN, and/or a WWAN.

FIG. 8 also shows a microphone 820 and one or more speakers 812 that can be used for audio input and output to and from the UE 800. A display screen 804 can be a liquid crystal display (LCD) screen, or another type of display screen such as an organic light emitting diode (OLED) display. The display screen 804 can be configured as a touch screen. The touch screen can use capacitive, resistive, or another type of touch screen technology. An application processor 814 and a graphics processor 818 can be coupled to an internal memory 816 to provide processing and display capabilities. A non-volatile memory port 810 can also be used to provide data I/O options to a user. The non-volatile memory port 810 can also be used to expand the memory capabilities of the UE 800. A keyboard 806 can be integrated with the UE 800 or wirelessly connected to the UE 800 to provide additional user input. A virtual keyboard can also be provided using the touch screen. A camera 822 located on the front (display screen) side or the rear side of the UE 800 can also be integrated into a housing 802 of the UE 800.

Figure 9:
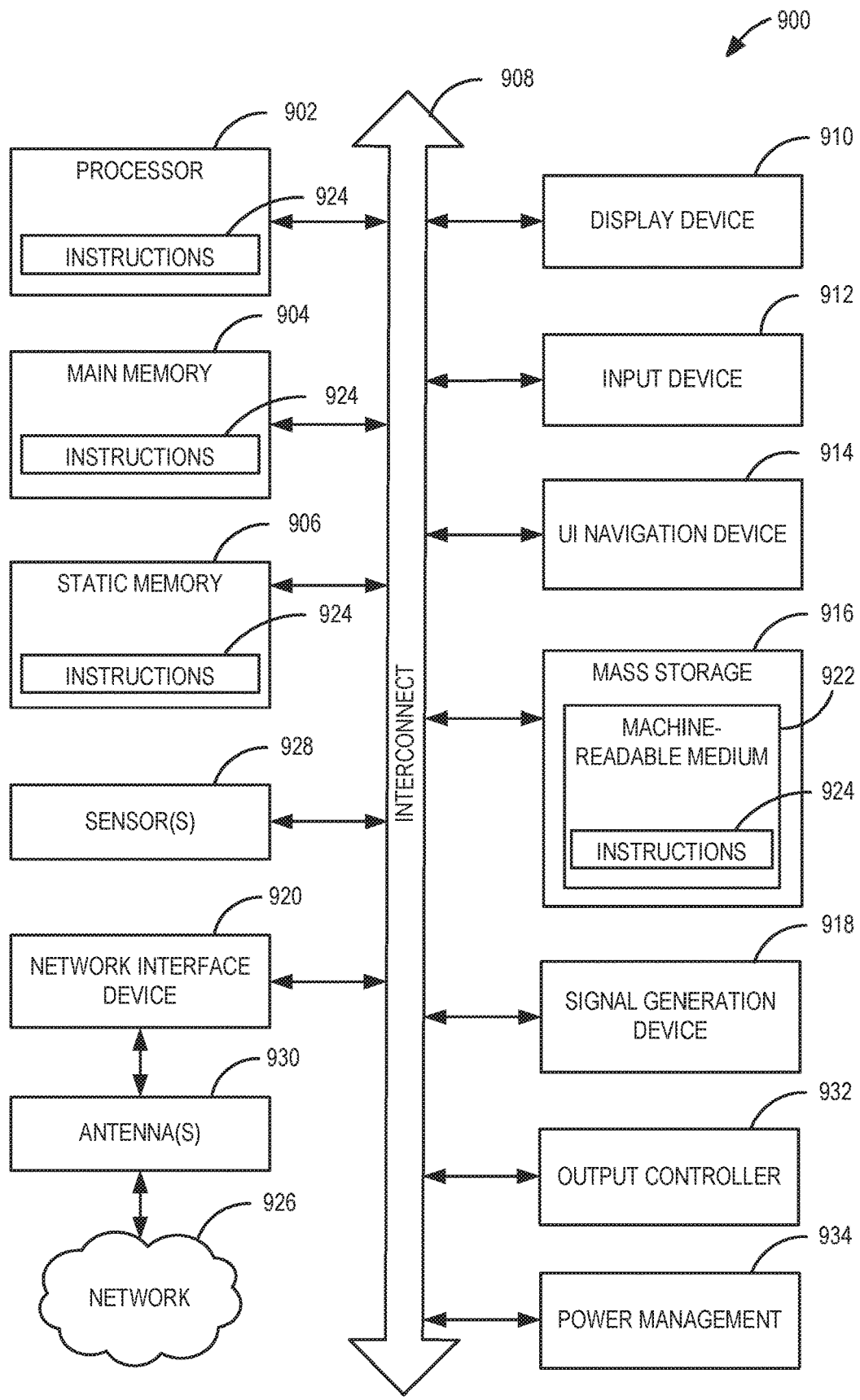
FIG. 9 is a block diagram illustrating an example computer system machine which may be used in association with various embodiments described herein.

FIG. 9 is a block diagram illustrating an example computer system machine 900 upon which any one or more of the methodologies herein discussed can be run, and which may be used to implement the eNB 150, the UE 101, or any other device described herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system machine 900 includes a processor 902 (e.g., a central processing unit (CPU), a graphics processing unit (GPU), or both), a main memory 904, and a static memory 906, which communicate with each other via an interconnect 908 (e.g., a link, a bus, etc.). The computer system machine 900 can further include a display device 910, an alphanumeric input device 912 (e.g., a keyboard), and a user interface (UI) navigation device 914 (e.g., a mouse). In one embodiment, the video display unit 910, input device 912, and UI navigation device 914 are a touch screen display. The computer system machine 900 can additionally include a mass storage device 916 (e.g., a drive unit), a signal generation device 918 (e.g., a speaker), an output controller 932, a power management controller 934, a network interface device 920 (which can include or operably communicate with one or more antennas 930, transceivers, or other wireless communications hardware), and one or more sensors 928, such as a GPS sensor, compass, location sensor, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904, static memory 906, and/or processor 902 during execution thereof by the computer system machine 900, with the main memory 904, the static memory 906, and the processor 902 also constituting machine-readable media.

While the machine-readable medium 922 is illustrated in an example embodiment to be a single medium, the term "machine-readable medium" can include a single medium or multiple media (e.g., a centralized or distributed database, and/or associated caches and servers) that store the one or more instructions 924. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions.

The instructions 924 can further be transmitted or received over a communications network 926 using a transmission medium via the network interface device 920 utilizing any one of a number of well-known transfer protocols (e.g., hypertext transfer protocol (HTTP)). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions) embodied in tangible media, such as floppy diskettes, CD-ROMs, hard drives, non-transitory computer readable storage media, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, Erasable Programmable Read-Only Memory (EPROM), flash drive, optical drive, magnetic hard drive, or other medium for storing electronic data. UE and eNB may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, Institute of Electrical and Electronic Engineers (IEEE) 902.11, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 902.16 (e.g., 902.16p), or Bluetooth (e.g., Bluetooth 8.0, or like standards defined by the Bluetooth Special Interest Group) standards families. Other applicable network configurations can be included within the scope of the presently described communication networks. It will be understood that communications on such communication networks can be facilitated using any number of PANs, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), RAM, semiconductor memory devices (e.g., EPROM, Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

It should be understood that the functional units or capabilities described in this specification may have been referred to or labeled as components or modules in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:

1. An apparatus of a user equipment (UE), the apparatus comprising:
a processor configured to cause the UE to:
detect a first physical downlink control channel (PDCCH) transmission comprising a first uplink grant associated with a first physical uplink shared channel (PUSCH) transmission;
determine, for transmission to a base station, a power headroom report that is dependent on if the UE is able to determine whether a first physical uplink control channel (PUCCH) transmission is simultaneously scheduled with the first PUSCH; and
encode the power headroom report for communication to the base station, using a PUCCH reference format transmission power for said determining the power headroom report when the UE is not able to determine whether the first PUCCH transmission is simultaneously scheduled with the first PUSCH transmission; and
transmit the power headroom report.

2. The apparatus of claim 1, wherein, when the UE is not able to determine whether the first PUCCH transmission is simultaneously scheduled with the first PUSCH transmission, the power headroom report is dependent on a bandwidth of the first PUSCH transmission, parameters provided by higher layer signaling, and a downlink path loss.

3. The apparatus of claim 2, wherein the power headroom report is further dependent on a current PUCCH power control adjustment state, a current PUSCH power control adjustment state, and bits per resource element (BPRE).

4. The apparatus of claim 1, wherein the processor is further configured to generate the power headroom report based on an expected transmission if the UE is able to determine whether the first PUCCH transmission is simultaneously scheduled with the first PDCCH.

5. The apparatus of claim 1, wherein if the UE is not able to determine whether the first PUCCH transmission is simultaneously scheduled with the first PUSCH transmission, the processor is further configured to generate the power headroom report using:

$$PH_{type2}(i) = P_{CMAX,c}(i) - 10 \log_{10} \left( 10^{(10 \log_{10}(M_{PUSCH,c}(i)) + P_{O\_PUSCH,c}(j) + a_c(j) \cdot PL_c + \Delta_{TF,c}(i) + f_c(i))/10} + 10^{(P_{0\_PUCCH} + PL_c + g(i))/10} \right).$$

6. The apparatus of claim 1, wherein the apparatus further comprises media access control (MAC) circuitry, wherein the MAC circuitry is configured to not reserve space for octet 2 of the power headroom report as part of the generation of the power headroom report if the UE is not able to determine whether the first PUCCH transmission is simultaneously scheduled with the first PUSCH transmission.

7. The apparatus of claim 6, wherein:
the power headroom report comprises an extended power headroom report (ePHR); and
the processor is further configured to set a V=1 value in octet 1 of the ePHR as part of the generation of the ePHR when the UE is not able to determine whether the first PUCCH transmission is simultaneously scheduled with the first PUSCH transmission.

8. The apparatus of claim 7, wherein the processor is further configured to calculate a reference type 2 report for use in the ePHR.

9. The apparatus of claim 1, wherein:
the power headroom report comprises an extended power headroom report (ePHR); and
the apparatus further comprises media access control (MAC) circuitry, wherein the MAC circuitry is configured to reserve space for octet 2 of the ePHR as part of the generation of the ePHR when the UE is able to determine that the first PUCCH transmission is simultaneously scheduled with the first PUSCH transmission.

10. The apparatus of claim 9, wherein the processor is further configured to clear a V value in octet 1 of the ePHR as part of the generation of the ePHR when the UE is able to determine that the first PUCCH transmission is simultaneously scheduled with the first PUSCH transmission.

11. The apparatus of claim 10, wherein the processor is further configured to calculate the ePHR based on a PUCCH transmission associated with a fixed PUCCH resource from a set of possible PUCCH format 1b with channel selection resources.

12. The apparatus of claim 11, wherein one of:
the fixed PUCCH resource is resource 0, and
the fixed PUCCH resource is set based on a subframe of the PUCCH transmission associated with the fixed PUCCH resource.

13. The apparatus of claim 12, wherein the ePHR is based on the first PUCCH transmission.

14. The apparatus of claim 13, wherein the processor is further configured to:
generate a UE capability communication for transmission to the base station, the UE capability communication comprising a timing field having a first value that identifies the UE as failing to meet a set of timing requirements; and
detect if the UE is able to determine whether the first PUCCH transmission is simultaneously scheduled with the first PUSCH transmission based on the first value.

15. The apparatus of claim 14, wherein the processor is further configured to:
adjust the first value to a second value, different from the first value, that identifies the UE as meeting the set of timing requirements based on a change in UE operation after generation of the ePHR; and
generate a second extended power headroom report (ePHR) based on the second value.

16. The apparatus of claim 1, wherein:
the PUCCH communications comprise format 1b transmissions with channel selection; and
the power headroom report comprises a type 2 report.

17. The apparatus of claim 2, wherein the processor is further configured to:
  decode a first physical downlink shared channel (PDSCH) transmission;
  pack the first PUSCH transmission; and
  complete decoding of the first PDSCH transmission later than packing of the first PUSCH transmission such that the UE is not able to determine if the first PUCCH transmission is simultaneously scheduled with the first PUSCH transmission.

18. The apparatus of claim 1, wherein the processor is further configured to:
  decode the first PDCCH transmission from the base station via an air gap; and
  generate the PUSCH transmission using a first carrier frequency for transmission using a second carrier frequency as part of the system with carrier aggregation.

19. A non-transitory computer readable medium comprising instructions that, when executed by one or more processors, configure a user equipment (UE) to:
  detect a first physical downlink control channel (PDCCH) transmission comprising a first uplink grant associated with a first physical uplink shared channel (PUSCH) transmission;
  encode the power headroom report for communication to the base station, wherein the power headroom report is dependent on whether the UE is able to determine whether a first physical uplink control channel (PUCCH) transmission is simultaneously scheduled with the first PUSCH, wherein when the UE is not able to determine whether the first PUCCH transmission is simultaneously scheduled with the first PUSCH transmission, the power headroom reportis dependent on a bandwidth of the first PUSCH transmission, parameters provided by higher layer signaling, current PUCCH and PUSCH power control adjustment states, and a downlink path loss; and
  transmit the power headroom report for communication to a base station.

20. The non-transitory computer readable medium of claim 19, wherein the instructions further configure the UE to:
  receive a first physical downlink shared channel (PDSCH) transmission, and
  pack the first PUSCH transmission, and
  complete decoding of the first PD SCH transmission later than packing of the first PUSCH transmission such that the UE is not able to determine if the first PUCCH transmission is simultaneously scheduled with the first PUSCH transmission.

* * * * *